United States Patent [19]
Eng et al.

[11] 3,884,778
[45] May 20, 1975

[54] ELECTROLYTIC PRODUCTION OF HYDROGEN PEROXIDE AND ALKALI METAL HYDROXIDE

[75] Inventors: Jeffrey D. Eng, North Vancouver, British Columbia; Cyril J. Harke, Burnaby, British Columbia, both of Canada

[73] Assignee: Hooker Chemicals & Plastics Corp., Niagara Falls, N.Y.

[22] Filed: Jan. 2, 1974

[21] Appl. No.: 430,004

[52] U.S. Cl. ............... 204/84; 204/82; 204/296; 204/95; 204/98; 204/257; 423/585
[51] Int. Cl. ...... C01b 11/02; C01d 1/06; B01k 3/00
[58] Field of Search ......... 204/82, 84, 103; 423/585

[56] References Cited
UNITED STATES PATENTS

| | | | |
|---|---|---|---|
| 1,299,485 | 4/1919 | Levin | 204/84 |
| 1,861,573 | 6/1932 | Kratky | 204/84 |
| 2,234,908 | 3/1941 | Adolph et al. | 204/84 |
| 3,135,673 | 6/1964 | Terrell et al. | 204/103 X |
| 3,165,460 | 1/1965 | Zang et al. | 204/103 X |
| 3,220,941 | 11/1965 | Osborne | 204/87 |
| 3,344,053 | 9/1967 | Neipert et al. | 204/266 |
| 3,438,879 | 4/1969 | Kircher et al. | 204/95 |
| 3,523,755 | 8/1970 | McRae | 204/92 X |
| 3,681,213 | 8/1972 | Heit et al. | 204/82 |
| 3,694,154 | 9/1972 | Harper et al. | 423/585 |
| 3,784,399 | 1/1974 | Grot | 117/62.1 |

FOREIGN PATENTS OR APPLICATIONS

| | | | |
|---|---|---|---|
| 78,121 | 3/1931 | Sweden | 204/84 |
| 1,045,675 | 10/1966 | United Kingdom | 104/92 |

*Primary Examiner*—F. C. Edmundson
*Attorney, Agent, or Firm*—Peter F. Casella; Donald C. Studley

[57] ABSTRACT

Hydrogen peroxide is made electrolytically in a three-compartment cell having an anion-active permselective membrane separating anode and buffer compartments and a cation-active permselective membrane separating the buffer compartment and cathode compartment, by feeding sulfuric acid to the anode compartment, alkali metal sulfate to the buffer compartment and water to the cathode compartment and withdrawing substantially sulfate-free alkali metal hydroxide solution from the cathode compartment and persulfuric acid from the anode compartment, after which the persulfuric acid is hydrolyzed to produce hydrogen peroxide and sulfuric acid.

The process is particularly useful for supplying hydrogen peroxide for use in wood pulping or pulp bleaching processes, especially in conjunction with chlorine dioxide bleaching, because alkali metal sulfate resulting from chlorine dioxide manufacture can be used as a reactant in the present process, a portion of the sulfuric acid produced in the present process may be used in the manufacture of chlorine dioxide, and the alkali metal hydroxide produced by the present process is also useful in pulping wood.

11 Claims, 1 Drawing Figure

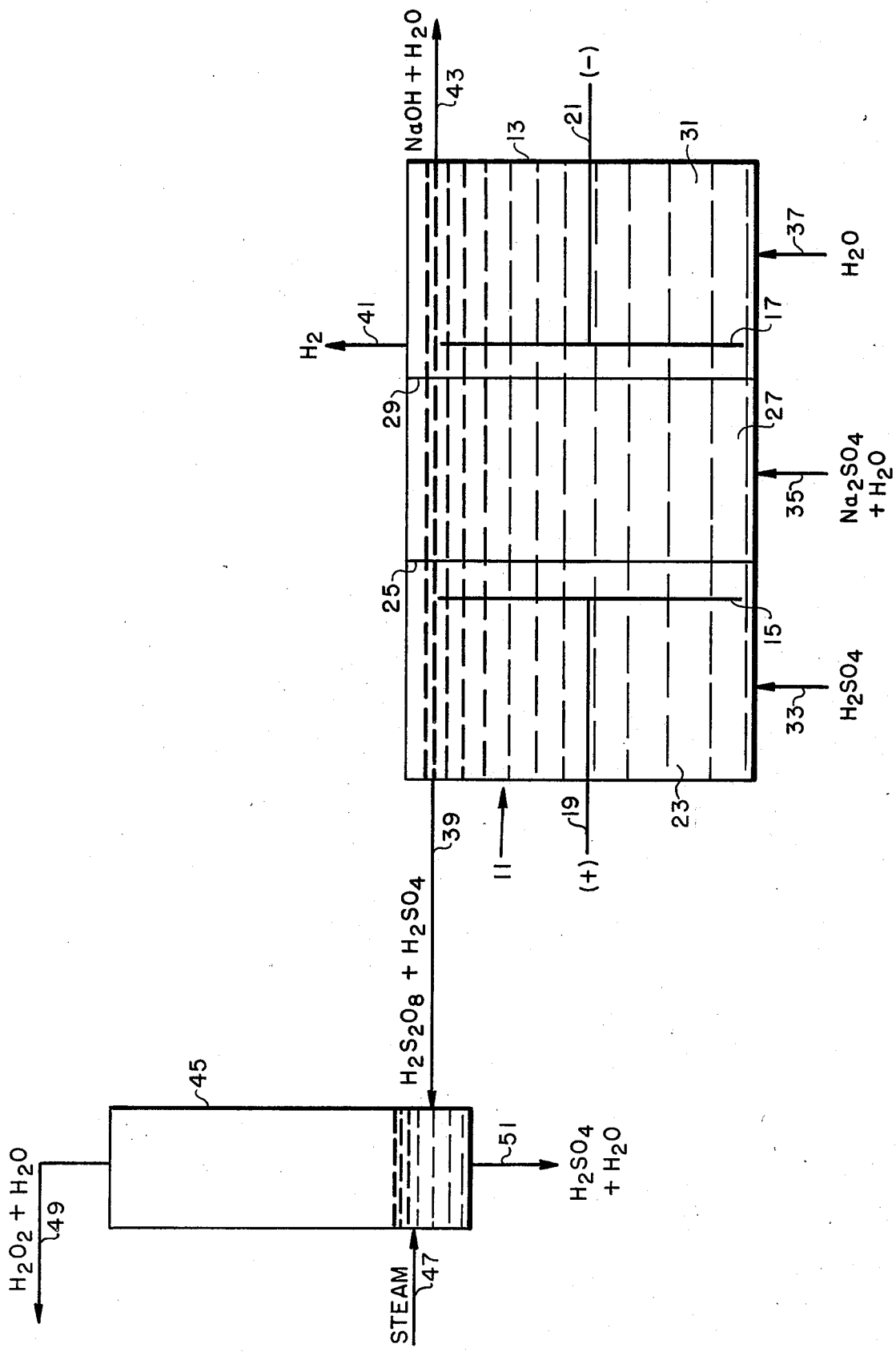

ELECTROLYTIC PRODUCTION OF HYDROGEN PEROXIDE AND ALKALI METAL HYDROXIDE

The present invention relates to a process for the electrolytic production of hydrogen peroxide. More particularly, it is of a method for making alkali metal hydroxide and persulfuric acid and then chemically converting the persulfuric acid to hydrogen peroxide and sulfuric acid. The alkali metal hydroxide is substantially a sulfate-free aqueous solution and the only reactants employed are alkali metal sulfate, water and sulfuric acid and of these, the sulfuric acid may be recycled.

Hydrogen peroxide is an important oxidizing and bleaching agent with almost limitless chemical applications. However, it is particularly useful for woodpulp bleaching, especially in conjunction with other bleaching agents, such as chlorine dioxide and chlorine. Aqueous alkali metal hydroxide, particularly aqueous sodium hydroxide, is also an important woodpulp industry chemical. The uses of these chemicals in the woodpulp industry has been hampered because no really practical method (and especially no practical electrochemical method) has been available for producing peroxide and hydroxide in a single efficient process. For example, conventional electrochemical production of hydrogen peroxide, e.g., from sulfuric acid by electrolytic oxidation of the acid to persulfuric acid followed by steam distillation of the persulfuric acid to produce hydrogen peroxide, does not produce alkali metal hydroxide and similarly, conventional electrolysis processes for the production of caustic do not yield any hydrogen peroxide. Moreover, in the known electrolytic processes for hydrogen peroxide the persulfate anion is often reduced at the cathode, severely limiting the ultimate yield of desired product. Also in the prior art electrolytic manufacturing of aqueous alkali metal hydroxide solution by electrolysis of alkali metal salt the hydroxide products are often objectionably "contaminated" with alkali metal salt. It is also particularly desirable that any process intended for the production of hydrogen peroxide and aqueous alkali metal hydroxide for use at or near pulp manufacturing or bleaching facilities should be designed to employ alkali metal sulfate as a reactant. This is so because the extensively used pulp bleaching agent, chlorine dioxide, being relatively unstable, is normally manufactured at or near woodpulp bleaching facilities and its chemical production from alkali metal chlorides and chlorates by reaction with sulfuric acid provides, as byproduct, large amounts of alkali metal sulfate, disposal of which has heretofore constituted a serious problem in the industry. In applicants' copending application entitled "Electrolytic Process for Manufacturing Chlorine Dioxide, Hydrogen Peroxide, Chlorine, Alkali Metal Hydroxide and Hydrogen", (Case 3209) Ser. No. 429,998, filed of even date with the present application, an electrochemical process for production of hydrogen peroxide, sulfuric acid and alkali metal hydroxide is described. The process of this copending application, however, does not utilize alkali metal sulfate as a reactant.

The aforementioned disadvantages of prior art processes are overcome and electrochemical production of hydrogen peroxide together with substantially salt-free alkali metal hydroxide solution, and sulfuric acid in excess of that used in process, using alkali metal sulfate as a reactant, is achieved by the process of this invention.

In accordance with the invention the process comprises electrolyzing in a cell having an anode compartment with an anode therein, a cathode compartment with a cathode therein and a buffer compartment between the anode and cathode compartments, an anion-active permselective membrane separating the anode and buffer compartments and a cation-active permselective membrane separating the buffer and cathode compartments, solutions resulting from feeding sulfuric acid to the anode compartment, alkali metal sulfate to the buffer compartment and water to the cathode compartment, so that in the passage of electric current through the cell, sulfate anion selectively diffuses from the buffer compartment to the anode compartment through the anion-active permselective membrane, sodium cation selectively diffuses from the buffer compartment to the cathode compartment through the cation-active permselective membrane, the sulfuric acid (or corresponding sulfate or bisulfate ion) is oxidized at the anode to produce a sulfuric acid solution of persulfuric acic and an alkali metal cation is reacted with water at the cathode to produce hydrogen and substantially alkali metal sulfate-free aqueous alkali metal hydroxide solution, withdrawing the persulfuric acid solution from the anode compartment, withdrawing hydrogen and the substantially sulfate-free hydroxide solution from the cathode compartment and reacting the persulfuric acid solution with water to produce hydrogen peroxide and sulfuric acid. The method is preferably effected continuously but batch embodiments of at least parts thereof, e.g., hydrolysis of the persulfuric acid, are also useful.

The invention will be readily understood by reference to the descriptions of embodiments thereof given in this specification, in conjunction with the drawing of means for carrying out a preferred embodiment of the process.

In the Drawing:

The FIGURE includes a schematic elevation of a three-compartment electrochemical cell for converting sulfuric acid, alkali metal sulfate and water to persulfuric acid, hydrogen and aqueous substantially sulfate-free alkali metal hydroxide. The FIGURE also includes hydrolysis means for converting the persulfuric acid to hydrogen peroxide and sulfuric acid by reaction with water in the form of steam.

In the FIGURE the points of addition and withdrawal of typical and preferred reactants and products are illustrated. Although the production of sodium hydroxide solutions, using sodium sulfate reactant, is illustrated, other alkali metal cations, such as potassium, may be employed. Furthermore, although the hydrolysis means which is illustrated is a steam distillation apparatus, it will be appreciated that other suitable vessels or apparatuses for reacting the persulfuric acid solution with water can be employed.

In the FIGURE electrolytic cell 11 includes outer wall 13, anode 15, cathode 17, and conductive means 19 and 21 for connecting the anode and cathode to sources of positive and negative electrical potentials, respectively. Inside the walled cell the anode compartment 23 is separated by an anion-active permselective membrane 25 from the buffer compartment 27, which in turn, is separated by a cation-active permselective membrane 29, from the cathode compartment 31. Sulfuric acid is fed to the anode compartment through line 33, aqueous sodium sulfate is fed to the buffer compartment through line 35, and water is fed to the cathode compartment through line 37. During electrolysis, sulfate anion diffuses from the buffer compartment to the anode compartment to aid in replenishing sulfuric acid or sulfate or bisulfate ion, which is oxidized at the anode to form hydrogen ion and persulfuric acid. The persulfuric acid is withdrawn as a solution in sulfuric acid through line 39. Also, during electrolysis sodium cation diffuses from the buffer compartment to the cathode compartment and is reacted with water at the cathode to form hydrogen, which is withdrawn through line 41, and aqueous sodium hydroxide which is withdrawn through line 43. It may also be considered that the sodium ion is reduced, at least momentarily, to sodium metal, which then reacts with water to yield hydroxide and hydrogen. The solution of persulfuric acid in sulfuric acid which is withdrawn from the anode compartment is fed to a steam distillation apparatus 45 and is hydrolytically distilled with steam fed to the apparatus through line 47. The steam distillate of aqueous hydrogen peroxide solution is recovered from the steam distillation apparatus through line 49, as a condensate, and the residue of aqueous sulfuric acid is withdrawn from the apparatus through line 51.

In the present process the overall electrolytic cell reaction is represented by Equation (1):

(1) $H_2SO_4 + 2H_2O + M_2SO_4 \rightarrow H_2S_2O_8 + H_2 + 2\ MOH$ wherein M represents an alkali metal cation, e.g., sodium or potassium.

The hydrolytic conversion of persulfuric acid to hydrogen peroxide and sulfuric acid proceeds by the known reaction represented by Equation (2):

(2) $H_2S_2O_8 + 2H_2O \rightarrow H_2O_2 + 2H_2SO_4$

The present process overcomes several serious disadvantages characteristic of prior art electrochemical processes for manufacturing hydrogen peroxide from sulfuric acid and alkali metal hydroxide from an aqueous alkali metal salt. Thus, the cation-active permselective membrane of the present process does not permit diffusion of persulfate anion into the cathode compartment, thereby preventing reduction of the persulfate anion at the cathode, which decomposition resulted in serious product losses in prior art electrolytic process. Moreover, the diffusion of sulfate anion into the cathode compartment is also prevented by the cation-active permselective membrane, thereby preventing any substantial contamination of the product alkali metal hydroxide with salt, such as alkali metal sulfate.

In initiating the electrolytic process of the invention the anode compartments of the cell are charged with sufficient sulfuric acid, in aqueous solution, as to initiate the electrolytic oxidation of the $H_2SO_4$ to $H_2S_2O_8$, while the buffer compartments are charged with sufficient alkali metal sulfate, also in aqueous solution, to avoid depletion and concentration polarization. Additionally, an aqueous solution containing about 0.1 to 1 percent of alkali metal hydroxide is charged into the cathode compartments. Advantageously, the cell is filled so as to provide a small free space, e.g., about 1 to 5% by volume of the cell, so as to facilitate collection and withdrawal of the gaseous cell product, hydrogen.

On connection of the conductive means to sources of positive and negative electrical potentials, to initiate electrolysis, the aqueous sulfuric acid and alkali metal sulfate reactants are fed to the cell at rates sufficient to establish concentrations which will effect the electrolysis in accord with Equation (1), typically at about an equimolar rate, usually ± 10 percent. During electrolysis water is charged at a sufficient rate to maintain the desired caustic concentration.

The cell is operated at a temperature above the freezing point of the liquid contents of the cell, usually above about 5°C., and below about 60°C. The higher limit is usually determined as that temperature at which the rate of formation of persulfuric acid from sulfuric acid is about equal to or uneconomically greater than the rate of hydrolytic decomposition of the peracid. Preferably, the cell is operated at a temperature below about 40°C., more preferably at about 20° to 35°C. and especially preferably at about 30° to 35°C.

The sulfuric acid charged to the anode compartment is generally aqueous sulfuric acid containing at least about 80 percent of sulfuric acid and is preferably concentrated sulfuric acid, aqueous sulfuric acid containing about 93 to 97 percent of sulfuric acid. Of course, if desired, stronger concentrations of sulfuric acid, including pure sulfuric acid, even oleums, can be employed.

The alkali metal sulfate is generally charged in aqueous solution at a concentration of from about 1 molar up to about the saturation solubility of the salt (i.e., about 3.5 molar). Preferably, the concentration of the aqueous alkali metal sulfate charged is about 3 molar.

The sulfuric acid solution of persulfuric acid produced in the anode compartment is reacted with water at about 60° to 100°C., preferably at about 100°C., to produce hydrogen peroxide in accord with known methods for the hydrolytic conversion of persulfuric acid to hydrogen peroxide. At least about two molar proportions of water per mole of persulfuric acid in the sulfuric acid solution thereof are employed in the hydrolysis, in accord with the stoichiometry of Equation (2), above, Advantageously, the water is charged in excess, e.g., from 10 to 50 percent excess, and is preferably in the form of steam. In an especially preferred embodiment of the invention the persulfuric acid solution is subjected to steam distillation to prepare hydrogen peroxide and the distillation is effected in a steam distillation apparatus comprising a still and a condenser of the types conventionally used for manufacture of hydrogen peroxide from persulfuric acid. In accord with the preferred embodiment of the invention the hydrogen peroxide is recovered from the steam distillation apparatus as an aqueous steam distillate, the concentration of the hydrogen peroxide in the distillate being determined by the amount of water used in the steam distillation. The residue produced in the steam distillation is aqueous sulfuric acid which can be concentrated, if desired, by evaporation or by additions of oleum or sulfur trioxide, a portion, as is required is recycled to the sulfuric acid feed stream to the anode compartment with the remainder being recovered as a by-product which may be used in other processes. Alternatively, it may be fed to the anode compartment directly, without fortification.

The aqueous alkali metal hydroxide solution recovered from the cathode compartment generally contains about 60 to 250 grams per liter, usually about 80 to 120 g./l. of alkali metal hydroxide and is substantially free of alkali metal sulfate. The product solution generally contains less than about 1.0 percent and under most preferred operating conditions less than about 0.1 percent of alkali metal sulfate. Thus, the aqueous caustic product is suitable, without further purification, for many applications wherein substantially salt-free aqueous caustic is desirable or necessary, for example, in pulping wood chips, neutralizing acids, peroxide bleaching, making caustic sulfites and in regenerating ion-exchange resins.

The electrolytic cell of the present process operates at a voltage drop of about 2.3 to 5 volts, preferably about 2.5 to 4 volts, and especially about 3 volts. The current density of the cell is about 0.5 to 4, preferably about 1 to 3 and more preferably about 2 amperes per square inch of electrode surface. The current efficiency of the present cell is generally at least about 70 percent or more and under preferred operating conditions is about 75 to 80 percent or even greater. The caustic efficiency of the electrolytic cell is generally greater than about 75 percent and under preferred operating conditions is 85 to 90 percent or more.

The anion-and cation-active membranes utilized in the invention to divide the electrolytic cell into compartments and to provide selective ion diffusion are preferably mounted in the cell on networks of supporting material(s), such as polytetrafluoroethylene, perfluorinated ethylene-propylene copolymer, polypropylene, asbestos, titanium, tantalum, niobium or noble metals. Preferably, polytetrafluoroethylene is employed.

The anion-active and cation-active permselective membranes are well-known organic polymeric films, represented by an extensive class of proprietary materials. They normally contain a multiplicity of ionogenic substituents which are capable of undergoing ion-exchanges with aqueous anions or cations. Anion-active membranes typically contain, as ionic substituents, quaternary ammonium groups, such as tetra(-lower alkyl)-substituted positively charged nitrogen or N-lower alkyl-substituted pyridinium groups, wherein the lower alkyl groups are of 1 to 6 carbon atoms. Anions, when contacted in aqueous solution with such membranes, may diffuse through the membrane via ion exchange at the quaternary ammonium substituents while the membrane remains impermeable toward cations in the solutions. Cation-active permselective membranes typically may contain, as ionic substituents, sulfonate or phosphonate groups. Cations brought into contact in aqueous solutions with the cation-active membranes diffuse through them via ion exchange at the sulfonate or phosphonate substituents while the membranes remain impermeable with respect to anions in the solution.

Anion-active polymeric membranes can be prepared by conventional polymerizations of one or more ethylenically unsaturated monomers and thereafter subjecting the polymer to a conventional reaction sequence for introducing quaternary ammonium groups. For example, styrene can be polymerized to polystyrene, skived to thin sheets and then subjected sequentially to conventional chloromethylation, amination, and quaternization reactions. Additionally, vinyl chloride can be polymerized to polyvinyl chloride, the chloride substituents of the polymer can be replaced by primary amino groups by conventional amination methods and the resultant amino groups can be converted to quaternary nitrogen or amino groups by a conventional quaternization reaction, e.g., a reaction of the primary amino-substituted polymer with a lower alkyl halide. As an alternative to the above synthetic routes, an ethylenically unsaturated monomer containing an amino substituent, e.g., vinyl pyridine, can be polymerized and the amino groups of the resultant polymer can then be subjected to quaternization. Cation-active polymeric membranes can be prepared by synthetic routes analogous to those described in the case of anion-active polymeric membranes. Thus, ethylenically unsaturated monomers such as ethylene, fluorinated olefins, vinyl chloride, styrene and the like can be homo- or copolymerized and a thin sheet of the resultant polymer can then be subjected to conventional phosphonation of sulfonation to introduce phosphonate or sulfonate substituents. Other polymers, such as phenol formaldehyde condensates, can be sulfonated according to known techniques, to introduce sulfonate groups. Alternatively, an ethylenically unsaturated monomer containing a halosulfonyl substituent, e.g., a fluorosulfonated perfluorovinyl ether, can be polymerized and the halosulfonyl groups of the resultant polymer can be hydrolyzed to produce a polymer containing a multiplicity of sulfonate substituents. Such products may also be subjected to post-treatments to selectively form amides or other functional groups on one or both sides thereof.

The structures and preparations of anion- and cation-active permselective membranes are more particularly described in the chapter entitled "Membranes" in the *Encyclopedia of Polymer Science and Technology*, published by J. Wiley and Sons (1968), at Volume 8, pages 620–638, and in the chapter entitled "Synthetic Resin Membranes" in *Diffusiion and Membrane Technology*, Rheinhold Publishing Corp., New York (1962), at pages 200–206, the pertinent subjects matter of which are incorporated herein by reference.

In addition to the anion-active membranes listed above, typical representative anion-active permselective membranes include the following proprietary polymers containing quaternary ammonium substituents: AMFion 310 series, anion type, designated by the manufacturer, American Machine and Foundry Co., as having a polymeric fluorocarbon base; Ionac MA 3148, MA 3236, MA 3475 and MA 3475 XL types, designated by the manufacturer, Ritter-Pfaulder Corporation, Permutit Division, as having a heterogeneous polyvinyl chloride base; and Amberlites, made by Dow Chemical Corp., and usually ammonium or quaternary ammonium functionalized styrene grafted onto a polymeric base, such as FEP, TFE, PVC, PE, nylon or polypropylene.

Preferably, the anion-active membrane utilized in the invention is a quaternary ammonium substituted fluorocarbon polymer or a quaternary ammonium substituted heterogeneous polyvinyl chloride based polymer.

In addition to the sulfonated and phosphonated cation-active polymeric membranes, carboxylated analogues may also be used. Typical representative cation-active membranes include the following proprietary polymeric membranes containing a multiplicity of sulfonate substituents: Ionac types MC 3142, 3235 and MC 3470, designated by the manufacturer, Ritter-Pfaudler Corporation, Permutit Division, as having a heterogeneous polyvinyl chloride base; Amberlites, made by Dow Chemical Corp., usually sulfonated or carboxylated polymers of types mentioned above; Nafion XR type, hydrolyzed copolymer of a perfluorinated olefin and a fluorosulfonated perfluorovinyl ether, manufactured by E. I. DuPont de Nemours and Company, Inc.; modified Nafion XR resin, made by treating one side of an XR membrane with ammonia to convert -SO$_2$F groups to -SO$_2$NH$_2$ groups, which are then hydrolyzed to SO$_2$NHNa structures; and sulfostyrenated perfluorinated ethylene propylene copolymer membranes, marketed as types 18ST12S and 16ST13S by RAI Research Corporation.

The cation-active-permselective membranes which are of a sulfostyrenated derivative of a perfluorinated ethylenepropylene polymer (FEP) are useful and are considered to be superior to the Amberlites and Ionacs but most preferred are the hydrolyzed copolymers of a perfluoroolefin and a fluorosulfonated perfluorovinyl ether and modifications thereof, such as the -SO$_2$NHNa modifications thereof.

To manufacture the sulfostyrenated FEP membranes a standard FEP, such as is manufactured by E. I. DuPont de Nemours and Company, Inc., is styrenated and the styrenated polymer is then sulfonated. A solution of styrene in methylene chloride or benzene at a suitable concentration in the range of about 10 to 20 percent is prepared and a sheet of FEP polymer having a thickness of about 0.02 to 0.5 mm., preferably 0.05 to 0.15 mm., is dipped into the solution. After removal it is subjected to radiation treatment, using a cobalt$^{60}$ radiation source. The rate of application may be in the range of about 8,000 rads/hr. and a total radiation application is about 0.9 megarad. After rinsing with water the phenyl rings of the styrene portion of the polymer are monosulfonated, preferably in the para position, by treatment with chlorosulfonic acid, fuming sulfuric acid or SO$_3$. Preferably, chlorosulfonic acid in chloroform is utilized and the sulfonation is completed in about one-half hour. Sulfostyrenated perfluoroethylene-propylene polymers of this type typically are from 16 to 18 percent styrenated and have two-thirds to thirteen-sixteenths of phenyl groups therein monosulfonated.

The hydrolyzed copolymer of a perfluoroolefin and a fluorosulfonated perfluorovinyl ether is preferably prepared by employing tetrafluoroethylene as the perfluoroolefin, although other perfluorinated hydrocarbons of 2 to 5 carbon atoms may also be utilized, of which the monoolefinic hydrocarbons are preferred, especially those of 2 to 4 carbon atoms and most especially, those of 2 to 3 carbon atoms, e.g., tetrafluoroethylene, hexafluoropropylene. The sulfonated perfluorovinyl ether which is most preferred is that of the formula

Such a material, named as perfluoro[2-(2-fluorosulfonylethoxy)-propyl vinyl ether], referred to henceforth as PSEPVE, may be modified to equivalent monomers, given by the general formula

wherein R$^1$ is a radical selected from the group consisting of fluorine and perfluoroalkyl radicals having from 1 to 1 carbon atoms, Y is a radical selected from the group consisting of fluorine and the trifluoromethyl radical, and $n$ is an integer of 1 to 3 inclusive. However, it is most preferred to employ PSEPVE as the perfluorovinyl ether.

The method of manufacture of the hydrolyzed copolymer is described in Example XVII of U.S. Pat. No. 3,282,875 and an alternative method is mentioned in Canadian Pat. No. 849,670, which also discloses the use of the finished membrane in fuel cells, characterized therein as electrochemical cells. The disclosures of such patents are hereby incorporated herein by reference. In short, the copolymer may be made by reacting PSEPVE or equivalent monomer with tetrafluoroethylene or equivalent monomer in desired proportions in water at elevated temperature and pressure for over an hour, after which time the mix is cooled. It separates into a lower perfluoroether layer and an upper layer of aqueous medium with dispersed desired polymer. The molecular weight is indeterminate but the equivalent weight is about 900 to 1,600 preferably 1,100 to 1,400, e.g., 1,250, and the percentage of PSEPVE or corresponding compound is about 10 to 30 percent, preferably 15 to 20 percent and most preferably about 17 percent. The unhydrolyzed copolymer may be compression molded at high temperature and pressure to produce sheets or membranes, which may vary in thickness from 0.02 to 0.5 mm. These are then further treated to hydrolyze pendant -SO$_2$F groups to -SO$_3$H groups, as by treating with 10 percent sulfuric acid or by the methods of the patents previously mentioned. The presence of the -SO$_3$H groups may be verified by titration, as described in the Canadian patent. Additional details of various processing steps are described in Canadian Pat. No. 752,427 and U.S. Pat. No. 3,041,317, also hereby incorporated by reference.

Because it has been found that some expansion accompanies hydrolysis of the copolymer it is particularly desirable to position the copolymer membrane after hydrolysis onto a frame or other support which will hold it in place in the electrolytic cell. Then it may be clamped or cemented in place and will be true, without sags. The membrane is preferably joined to the backing tetrafluoroethylene or other suitable support filaments prior to hydrolysis, when it is still thermoplastic, and the film of copolymer covers each filament, penetrating into the spaces between them and even around behind them, thinning the films slightly in the process, where they cover the filaments.

The aminated and hydrolyzed improvements or modifications of the polytetrafluoroethylene-PSEPVE copolymers are made, as previously indicated, by treatment with ammonia on one side of the copolymer, before hydrolysis thereof, and then hydrolysis with caustic or other suitable alkali. Acid forms may also be utilized. The final hydrolysis may be conducted after the membrane is mounted on its supporting network or screen. The membranes so made are fluorinated polymers having pendant side chains containing sulfonyl groups which are attached to carbon atoms bearing at least one fluorine atom, with sulfonyl groups on one surface being in -(SO$_2$NH)$_n$M form, where M is H, NH$_4$, alkali metal or alkaline earth metal and n is the valence of M, and the sulfonyls of the polymer on the other membrane surface being in -(SO$_3$)$_p$Y or -SO$_2$F form, wherein Y is a cation and $p$ is the valence of the cation, with the requirement that when Y is H, M, is also H. In use the sulfonamide side faces the cathode.

A complete description of methods for making the above improved membrane is found in French Pat. No. 2,152,194 of E. I. DuPont de Nemours and Company, Inc., corresponding to U.S. patent application Ser. No.

178,782, filed Sept. 8, 1971 in the name of Walther Gustav Grot, which disclosures are hereby incorporated herein by reference.

The hydrolyzed copolymer membranes are more stable at elevated temperatures, e.g., above 65°C. They last for much longer time periods in the medium of the electrolyte and the caustic product and do not as quickly become objectionably brittle, even at high cell temperatures. Considering the savings in time and fabrication costs, the present hydrolyzed copolymer membranes are more economical. The voltage drop through such a membrane is acceptable and does not become inordinately high, as it does with many other cation-active membrane materials, when the caustic concentration in the cathode compartment increases to above 100 to 200 g./l. of caustic. The selectivity of the membrane and its compatibility with the electrolyte do not decrease detrimentally as the hydroxyl concentration in the catholyte liquor increases, as has been noted with other membrane materials. Furthermore, the caustic efficiency of the electrolysis does not diminish as significantly as it does with other membranes when the hydroxyl ion concentration in the catholyte increases. These differences are significant in making the present process more advantageous than those of the prior art.

While the more preferred hydrolyzed copolymers are those having equivalent weights of 900 to 1,600, with 1,100 to 1,400 being most preferred, some useful resinous membranes employed in the present method may be of equivalent weights from 500 to 4,000. The medium equivalent weight polymers are preferred because they are of satisfactory strength and stability, enable better selective ion exchange to take place and are of lower internal resistances, all of which are important to the present electrochemical process.

The improved versions of the tetrafluoroethyleneP-SEPVE copolymers made by chemical treatment of surfaces thereof to modify the $-SO_3H$ groups thereon may have the modification only on the surface or extending as much as half way through the membrane. The depth of treatment will usually be from 0.001 to 0.2 mm. Caustic efficiencies of the invented processes, using such modified versions of the present improved membranes can increase about 3 to 20 percent, often about 10 to 20 percent, over the unmodified membranes.

The cation-active membranes of the process can be of different cation-active permselective membrane materials when a plurality of buffer compartments or zones is present. Similarly the anion-active membranes of the process can be composed of different anion-active permselective membrane materials. Preferably, however, the cation-active membranes are of the same cation-active permselective material and the anion-active membranes are of the same anion-active permselective materials.

The membrane walls of both the anion-active and cationactive membranes of the cell will normally be from 0.02 to 0.5 mm. thick, preferably from 0.1 to 0.3 or 0.4 mm. When mounted on a polytetrafluoroethylene, asbestos, titanium or other suitable network for support, the network filaments or fibers will usually have a thickness of 0.01 to 0.5 mm., preferably 0.05 to 0.15 mm., corresponding to up to the thickness of the membrane. Often it will be preferable for the fibers to be less than half the film thickness but filament thicknesses greater than that of the film may also be successfully employed, e.g., 1.1 to 5 times the film thickness. The networks, screens or cloths have an area percentage of openings therein from about 8 to 80 percent, preferably 10 to 70 percent and most preferably 20 to 70 percent. Generally the cross-sections of the filaments will be circular but other shapes, such as ellipses, squares and rectangles, are also useful. The supporting network is preferably a screen or cloth and although it may be cemented to the membrane the hydrolyzed copolymer membrane is preferably fused to the supporting network by high temperature, high pressure compression prior to hydrolysis of the copolymer. The cemented or fused membrane-network composites are readily clamped or otherwise fastened within the cell in conventional holders or supports.

The material of construction of the cell body may be conventional, including steel, concrete or stressed concrete or other suitably strong material lined with mastics, rubbers, e.g., neoprene, polyvinylidene chloride, FEP, chlorendic acid based polyester, polypropylene, polyvinyl chloride, polytetrafluoroethylene or other suitable inert plastic, usually being in tank or box form. Substantially self-supporting structures, made of rigid polyvinyl chloriide, polyvinylidene chloride, polypropylene or phenol formaldehyde resins may be employed, preferably reinforced with molded-in fibers, cloths or webs, such as asbestos fibers.

For satisfactory and efficient operations the cell is constructed so that the volume of the buffer compartment(s) is from about 1 to 100 percent of the sum of the volumes of the anode and cathode compartments, preferably about 5 to 70 percent when there is only a single buffer compartment, most preferably about 50 percent, and the anode and cathode compartment volumes are about the same.

While the compartments of the present cell will usually be separated from each other by flat membranes and will usually be of substantially rectilinear or parallelepipedal construction, various other shapes, including curves, e.g., cylinders, spheres, ellipsoids; and irregular surfaces, e.g., sawtoothed or plurally pointed walls, may also be utilized. In accord with conventional electrochemical practice, pluralities of individual cells of the invention can be employed in multi-cell units, often having common feed and product manifolds, and being housed in unitary structures or in a filter press assembly, set up for either continuous or batch operations.

The electrodes of the cell and the conductive means attached are made of any electrically conductive material which will resist the attack of the various cell contents. In general, the cathodes are made of graphite, iron, lead dioxide on graphite or titanium, steel or noble metal, such as platinum, iridium, ruthenium or rhodium. Of course, when using the noble metals, they may be deposited as surfaces on conductive substrates, e.g., copper, silver, aluminum, steel, iron, and other electrode materials may also be only surfaces on substrates. Preferably, the cell cathode is of steel, although if desired, graphite, especially of high density graphite, e.g., graphite having a density of about 1.68 to 1.78 g./ml. may also be used.

The conductive means attached to the electrodes may be aluminum, copper, silver, steel or iron, with copper being much preferred, and preferably, the conductor is protected, if desirable, from the electrolyte and electrolytic products by being clad or plated with a resistant material, e.g., platinum.

The anode should be resistant to attack by persulfuric acid and accordingly should preferably be a persulfuric acid inert noble metal oxide or alloy. The anode preferably is platinum or platinum-clad tantalum, with platinum being preferred. The conductive means attached to the anode, is also desirably protected against the persulfuric acid in the anode compartment and preferably is tantalum encased in platinum.

The present process provides efficiently, without excessively elaborate or costly reaction equipment, the important woodpulp bleaching reagent, hydrogen peroxide, together with aqueous caustic, which is highly useful in pulping woodchips. Since the present process requires at most only two reaction vessels or stages and requires little space, the equipment can be readily located near pulp manufacturing and pulp bleaching facilities. The location of the present equipment at such processes is, of course, desirable to facilitate use of the peroxide and caustic products of the present method in pulp production and bleaching operations, but is additionally advantageous when such locations contain or are near facilities for manufacturing chlorine dioxide bleach from sulfuric acid, alkali metal chloride, and alkali metal chlorate. This is so because such production of chlorine dioxide results in larger quantities of alkali metal sulfate, which the present process utilizes as a reactant but which, heretofore, has represented a serious disposal problem. Furthermore the sulfuric acid which is produced in the hydrolysis step of the present process can, instead of being recycled to the electrolyte cell, as in a preferred embodiment of the invention, be utilized, if desired or necessary, as a reagent in the manufacture of chlorine dioxide.

The following examples illustrate but do not limit the invention. All parts herein are by weight unless otherwise indicated, and all temperatures are in °C.

EXAMPLE 1

A three-compartment electrolytic cell as illustrated in the FIGURE is utilized to produce aqueous, substantially sodium sulfate-free sodium hydroxide, hydrogen and persulfuric acid, which is then hydrolyzed to hydrogen peroxide. The cell walls are asbestos-filled polypropylene. The anode is platinum mesh which is communicated with a positive direct current electrical source through a platinum-clad tantalum or copper conductor rod. The cathode is of high density type graphite (Union Carbide Co. type AGLX, density 1.68–1.78 g./ml.) and is communicated with a negative direct current source through a titanium clad copper conductor rod. The anode and cathode are each about 2 inches wide and about 30 inches high.

The cation-active permselective membrane which separates the cathode compartment from the buffer compartment is a Nafion membrane manufactured by E. I. DuPont de Nemours and Company, Inc., and sold by them as their XR type membrane. The membrane is 7 mils thick (about 0.2 mm.) and is joined to a backing or supporting network of polytetrafluoroethylene (Teflon) filaments of a diameter of about 0.1 mm., woven into a cloth which has an area percentage of openings therein of about 22 percent. The membrane was initially flat and was fused onto the Teflon cloth by high temperature, high compression pressing, with some of the membrane portions actually flowing around the filaments during the fusion process to lock onto the cloth without thickening the membrane between the filaments.

The material of the Nafion XR permselective membrane contains a multiplicity of sulfonate substituents and is a hydrolyzed copolymer or tetrafluoroethylene and $FSO_2CF_2CF_2OCF(CF_3)CF_2OCF=CF_2$ which has an equivalent weight in the 900 to 1,600 range, about 1,250.

The anion-active permselective membrane which separates the anode compartment from the buffer compartment is derived from a heterogeneous polyvinyl chloride polymer containing a multiplicity of quaternary ammonium substituents. The anion-active membrane is an Ionac type MA 3475R membrane (manufactured by Ritter-Pfaudler Corporation, Permutit Division) having a thickness of about 14 mils (0.4 mm.) which is mounted on a Teflon cloth similar to that employed as a supporting network for the cation-active permselective membrane.

The cell electrodes are in contact with the anionactive and cation-active permselective membranes, with the "flatter" sides of the membranes facing the contacting electrodes. In some experiments spacings of about 0.01 to 10 cm. between the electrodes and the membranes are utilized and satisfactory results are obtained but the present arrangement and the absence of spacings are preferred. The interelectrode distance and the width of the buffer compartment are about 6 cm. and the volume ratios of anode compartment : buffer compartment : anode is about 2 : 1 : 2,±100 percent.

The cell is filled with water to about 95 percent capacity, with the remaining space being left at the top of the cell to facilitate collection of gaseous hydrogen from the cathode compartment. In small amounts sulfuric acid is introduced into the anode compartment, sodium sulfate is charged to the buffer compartment and sodium hydroxide is introduced into the cathode compartment, to provide about a 1 percent concentration of these electrolytes in the indicated compartments and thereby to provide conduction of electric current through the cell. The cell is externally cooled by circulating water to maintain a temperature of about 30° to 35°C. during electrolysis.

When electrolysis is initiated by passage of direct current through the cell concentrated aqueous sulfuric acid (containing about 93 percent sulfuric acid) is continuously fed to the anode compartment, aqueous sodium sulfate solution containing about 3 moles per liter of sodium sulfate is fed continuously to the buffer compartment and water is continuously added to the cathode compartment. The rates of addition of sulfuric acid and sodium sulfate are adjusted so that the mole ratio of acid and sulfate salt feed rate is about 1 : 1 ±20 percent. Water is charged continuously to the cathode compartment at a rate sufficient to maintain the liquid level in the cell substantially constant. During electrolysis the voltage drop in the cell is about 3 volts and the current density is about 2 amperes per square inch of electrode surface.

A sulfuric acid solution of persulfuric acid is continuously withdrawn as product from the anode compartment. This solution is subjected to distillation with steam at 100°C. in stoichiometric excess of 10 to 500 percent in a conventional glass steam distillation apparatus, including a still pot equipped with an inlet tube for introducing steam below the surface of the liquid in the pot, agitation means, a water cooled condenser and a distillate receiver. The distillate recovered from the steam distillation is aqueous hydrogen peroxide containing about 4 percent of the peroxide. The distilland recovered from the steam distillation still pot is aqueous sulfuric acid which is adjusted to the concentration of the sulfuric acid feed stream to the anode compartment by evaporation, addition of oleum or combination with other sulfuric acid in the feed stream, for recycling to the electrolytic cell anode compartment.

Gaseous hydrogen and aqueous sodium hydroxide are continuously withdrawn as products from the cathode compartment during electrolysis. The aqueous caustic product contains about 100 g./l. of sodium hydroxide and less than about 0.1 percent of the salt reactant, sodium sulfate. The cell operates at a caustic efficiency of about 90 percent and at a current efficiency of about 75 percent, even when producing 80 to 120 or 60 to 150 g./l. caustic.

In a modification of the above laboratory cell for large scale plant application, the thickness of the cation-active permselective membrane is increased to 10 to 14 mils, at which thickness the caustic efficiency increases but the voltage drop also increases. Accordingly, although cation-active membranes of greater thickness are operative in the present process, it is preferred to employ the 7 mils thick cation-active permselective membrane. A cation-active membrane which is about 4 mils thick is also used and is satisfactory although caustic efficiency is decreased slightly.

The cation-active membrane of the present experiment does not show any deterioration in appearance, operating efficiency or selectivity toward ion diffusion, even after operation in the present process for considerable times and is expected to have a useful life of over a year.

EXAMPLE 2

The procedure of Example 1 is repeated except that the anion-active permselective membrane employed is an AMFion 310 series anion-type membrane (manufactured by American Machine and Foundry Co.). This membrane, which has a thickness of about 6 mils (about 0.18 mm.) is a proprietary fluorocarbon polymer containing a multiplicity of quaternary ammonium substituents as anion-exchanging groups. The cell using this anion-active membrane is operated continuously and membrane performance is satisfactory with the production of persulfuric acid and caustic being like that of Example 1. Nevertheless, it is observed that the resistances of the anion-active permselective membranes to deterioration are lower than those of the cation-active membranes used.

EXAMPLE 3

The procedure of Example 1 is followed and essentially the same results are obtained, utilizing the cation-active RAI Research Corporation membranes identified as 18ST12S and 16ST13S, respectively, instead of the hydrolyzed copolymer of tetrafluoroethylene and sulfonated perfluorovinyl ether. The membranes stand up well under the described operating conditions and after continuous operation for several days are significantly better in appearance and operating characteristics, e.g., physical appearance, uniformity, voltage drop, than other cationactive permselective membranes available (except the hydrolyzed copolymers of perfluoroolefins and fluorosulfonated perfluorovinyl ether of the type utilized in Example 1, or the modifications thereof).

The invention has been described with respect to working examples and illustrative embodiments but it is not to be limited to these because it is evident that one of ordinary skill in the art will be able to utilize substitutes and equivalents without departing from the spirit of the invention or going beyond the scope of the claims.

What is claimed is:

1. A method for electrolytically manufacturing hydrogen peroxide, aqueous alkali metal hydroxide and aqueous sulfuric acid which comprises electrolyzing in a cell having an anode compartment with an anode therein, a cathode compartment with a cathode therein, and a buffer compartment separating the anode and cathode compartments, an anion-active permselective membrane separating the anode and buffer compartments, and a cation-active permselective membrane separating the buffer and cathode compartments, solutions resulting from feeding sulfuric acid to the anode compartment and alkali metal sulfate to the buffer compartment, so that with the passage of direct electric current through the cell, sulfate anion selectively diffuses from the buffer compartment to the anode compartment through the anion-active permselective membrane, sodium cation selectively diffuses from the buffer compartment to the cathode compartment through the cation-active permselective membrane, sulfuric acid is oxidized at the anode to produce a sulfuric acid solution of persulfuric acid, and sodium cation is reacted with water at the cathode to produce hydrogen and a substantially alkali metal sulfate-free aqueous alkali metal hydroxide solution, withdrawing the persulfuric acid solution from the anode compartment, withdrawing the hydrogen and substantially alkali metal sulfate-free aqueous alkali metal hydroxide solution from the cathode compartment and reacting the persulfuric acid solution with water to produce hydrogen peroxide and sulfuric acid.

2. A method according to claim 1 wherein the alkali metal sulfate is sodium sulfate, the electrolytic cell is operated at a temperature below about 60°C. and the persulfuric acid solution recovered from the anode compartment is reacted with at least about two moles of water per mole of persulfuric acid.

3. A method according to claim 2 wherein the material of the anion-active membrane is selected from the group consisting of quaternary ammonium group-substituted fluorocarbon polymers and quaternary ammonium-substituted polymers derived from heterogeneous polyvinyl chloride, the cation-active membranes are selected from the group consisting of hydrolyzed copolymers of perfluorinated olefin and a fluorosulfonated perfluorinated vinyl ether, fluorinated polymers having pendant side chains containing sulfonyl groups which are attached to carbon atoms bearing at least one fluorine atom, with sulfonyl groups on one surface being in $-(SO_2NH)_nM$ form where M is H, $NH_4$, alkali metal or alkaline earth metal and n is the valence of M, and the sulfonyls of the polymer on the other membrane surface being in $-(SO_3)_pY$ form wherein Y is a cation and p is the valence of the cation and when Y is H, M is also H, or being $-SO_2F$, and sulfostyrenated perfluorinated ethylene propylene copolymers, the sulfuric acid charged to the anode compartment is aqueous sulfuric acid containing about 80 percent by weight sulfuric acid, and the sodium sulfate is charged in aqueous solution.

4. A method according to claim 3 wherein the surface of the anode is of a persulfuric acid-inert noble metal, the surface of the cathode is of a material selected from the group consisting of platinum, iridium, ruthenium, rhodium, graphite, iron and steel, the hydrolyzed copolymer is derived from tetrafluoroethylene and fluorosulfonated perfluorovinyl ether of the formula $$FSO_2CF_2CF_2OCF(CF_3)CF_2OCF=CF_2$$

and has an equivalent weight of about 900 to 1,600, the fluorinated polymer with different side materials is a perfluorinated copolymer of tetrafluoroethylene and $FSO_2CF_2CF_2OCF(CF_3)CF_2OCF=CF_2$ in a molar ratio of about 7:1, M and Y are both sodium and $n$ and $p$ are both 1, and the sulfostyrenated perfluorinated ethylene propylene copolymer is about 16 to 18 percent styrenated and has from about two-thirds to thirteen-sixteenths of the phenyl groups therein monosulfonated, the thicknesses of the cation-active membrane and the anion-active membrane are between about 0.02 to 0.5 mm., the concentration of sulfuric acid in the sulfuric acid feed solution to the anode compartment is about 93 to 97 percent by weight, the concentration of sodium sulfate in the aqueous feed solution to the buffer compartment is about 1 to 3.5 molar and the sulfuric acid and sodium sulfate are fed to the cell at about equimolar rates.

5. A method according to claim 4 wherein the cell operates at a temperature of from about 20° to 35°C., the hydrolyzed copolymer is utilized and has an equivalent weight of from about 1,100 to 1,400, the cation-active and anion-active membranes are mounted on networks of material(s) selected from the group consisting of polytetrafluoroethylene, asbestos, perfluorinated ethylene-propylene copolymer, polypropylene, titanium, tantalum, niobium and noble metals, which have area percentage(s) of openings therein from about 8 to 80 percent and the persulfuric acid solution recovered from the anode compartment is reacted with water at a temperature of about 60° to 100°C. to produce hydrogen peroxide.

6. A method according to claim 5 wherein the cell operates at a voltage of about 2.3 to 5 volts and a current density of about 0.5 to 4 amperes per square inch of electrode surface, the anode is selected from the group consisting of platinum and platinum clad tantalum, the cathode is of mild steel or graphite having a density of about 1.68 to 1.78 grams per milliliter, the substantially sodium chloride-free hydroxide solution contains about 60 to 250 grams per liter of sodium hydroxide and the persulfuric acid solution recovered from the anode compartment is treated with steam at about 100°C. to produce hydrogen peroxide.

7. A method according to claim 6 wherein the cell operates at a voltage of about 2.5 to 4 volts, a current density of about 1 to 3 amperes per square inch of electrode surface and a temperature of about 30° to 35°C., the membranes are from about 0.1 to 0.4 mm. thick, and are mounted on a network of polytetrafluoroethylene filaments with the area percentage of openings in the network being from 10 to 70 percent, the concentration of sodium hydroxide in the aqueous hydroxide solution recovered from the cathode compartment is about 80 to 120 grams per liter, and the persulfuric acid solution recovered from the anode compartment is steam distilled to recover aqueous hydrogen peroxide as distillate and aqueous sulfuric acid as distilland.

8. A method according to claim 7 wherein the cationactive membranes are of the hydrolyzed copolymer having an equivalent weight of about 1,250, the cell operates at about 3 volts and a current density of about 2 amperes per square inch of electrode surface, the anode is of platinum, the concentration of sodium sulfate charged to the buffer compartment is about 3 molar, the hydroxide solution recovered from cathode compartment contains about 100 grams per liter of sodium hydroxide and the aqueous sulfuric acid distilland recovered is recycled as sulfuric acid feed to the anode compartment.

9. A method according to claim 8 wherein the anionactive membrane is a quaternary ammonium-substituted fluorocarbon polymer.

10. A method according to claim 8 wherein the anion-active membrane is a quaternary ammonium-substituted polymer derived from a heterogeneous polyvinyl chloride.

11. A method for electrolytically manufacturing persulfuric acid and aqueous alkali metal hydroxide from the sulfuric acid and alkali metal sulfate which comprises electrolyzing in a cell having an anode compartment with an anode therein, a cathode compartment with a cathode therein, and one or more intermediate buffer compartments separating the anode and cathode compartments, an anion-active permselective membrane separating the anode and buffer compartments, and a cation-active permselective membrane separating the buffer and cathode compartments, solutions resulting from feeding sulfuric acid to the anode compartment and alkali metal sulfate to one or more buffer compartments, so that with the passage of direct electric current through the cell, sulfate anion selectively diffuses from the buffer compartment to the anode compartment through the anion-active permselective membrane, sodium cation selectively diffuses from the buffer compartment to the cathode compartment through the cation-active permselective membrane, sulfuric acid is oxidized at the anode to produce a sulfuric acid solution of persulfuric acid, and sodium cation is reacted with water at the cathode to produce hydrogen and aqueous alkali metal hydroxide solution, withdrawing the persulfuric acid solution from the anode compartment and withdrawing the hydrogen and alkali metal hydroxide solution from the cathode compartment.

* * * * *

UNITED STATES PATENT OFFICE
CERTIFICATE OF CORRECTION

PATENT NO. : 3,884,778
DATED : May 20, 1975
INVENTOR(S) : Jeffrey D. Eng et al

It is certified that error appears in the above-identified patent and that said Letters Patent are hereby corrected as shown below:

Column 2, line 23, change "acic" to ---acid---;
Column 7, line 63, change "1 to 1" to ---1 to 10---;
Column 10, line 24, change "chloriide" to ---chloride---.

Signed and Sealed this fourteenth Day of October 1975

[SEAL]

Attest:

RUTH C. MASON
Attesting Officer

C. MARSHALL DANN
Commissioner of Patents and Trademarks